United States Patent [19]
Kasuga et al.

[11] Patent Number: 6,099,071
[45] Date of Patent: *Aug. 8, 2000

[54] HOLLOW FRAME MEMBER OF ALUMINUM ALLOY FOR VEHICLE BODY FRAME

[75] Inventors: Tatsuo Kasuga; Hideaki Takaishi; Masayoshi Okamoto, all of Wako, Japan

[73] Assignee: Honda Giken Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/145,413

[22] Filed: Sep. 1, 1998

[30] Foreign Application Priority Data

Sep. 2, 1997 [JP] Japan ..................................... 9-236826
Sep. 2, 1997 [JP] Japan ..................................... 9-236827

[51] Int. Cl.⁷ ........................................................ B60J 7/00
[52] U.S. Cl. .......................... 296/205; 296/189; 52/735.1
[58] Field of Search ..................................... 296/194, 195, 296/203.01, 203.02, 203.04, 204, 205, 189; 52/731.2, 731.6, 735.1, 732.1; D25/61; 138/137, 177, DIG. 11

[56] References Cited

U.S. PATENT DOCUMENTS

| | | |
|---|---|---|
| 2,653,782 | 9/1953 | Pfaff ....................................... 248/221 |
| 4,355,844 | 10/1982 | Fantini Muzzarelli ................. 296/205 |
| 4,560,198 | 12/1985 | Katano et al. ........................... 296/185 |
| 5,011,201 | 4/1991 | Takahashi et al. ...................... 296/203 |
| 5,316,367 | 5/1994 | Enning et al. .......................... 296/189 |
| 5,346,276 | 9/1994 | Enning et al. .......................... 296/203 |
| 5,364,128 | 11/1994 | Ide ......................................... 280/784 |
| 5,540,016 | 7/1996 | Clausen ...................................... 52/98 |
| 5,562,329 | 10/1996 | Srock et al. ............................ 296/203 |
| 5,810,428 | 9/1998 | Maki .................................. 296/203.02 |
| 5,913,565 | 1/1999 | Watanabe ............................... 296/189 |

FOREIGN PATENT DOCUMENTS

| | | | |
|---|---|---|---|
| 004304920 | 9/1993 | Germany ............................... 296/194 |
| 000632639 | 11/1949 | United Kingdom .............. 296/203.01 |
| 092011168 | 7/1992 | WIPO ................................... 296/205 |

*Primary Examiner*—D. Glenn Dayoan
*Assistant Examiner*—Paul Chenevert
*Attorney, Agent, or Firm*—Arent Fox Kintner Plotkin & Kahn, PLLC

[57] ABSTRACT

A hollow frame member of an aluminum alloy for a vehicle body frame includes a front pipe portion. The front pipe portion has an annular end surface as a surface receiving a collision load at a front end thereof. In the front pipe portion, a cross sectional area is gradually increased from a base end toward the receiving surface, and a thickness is gradually decreased from the base end toward the receiving surface. Thus, the front pipe portion can be crushed early and stably from the receiving surface upon collision of the vehicle to enhance the collision energy absorbing efficiency.

10 Claims, 8 Drawing Sheets

FIG.6
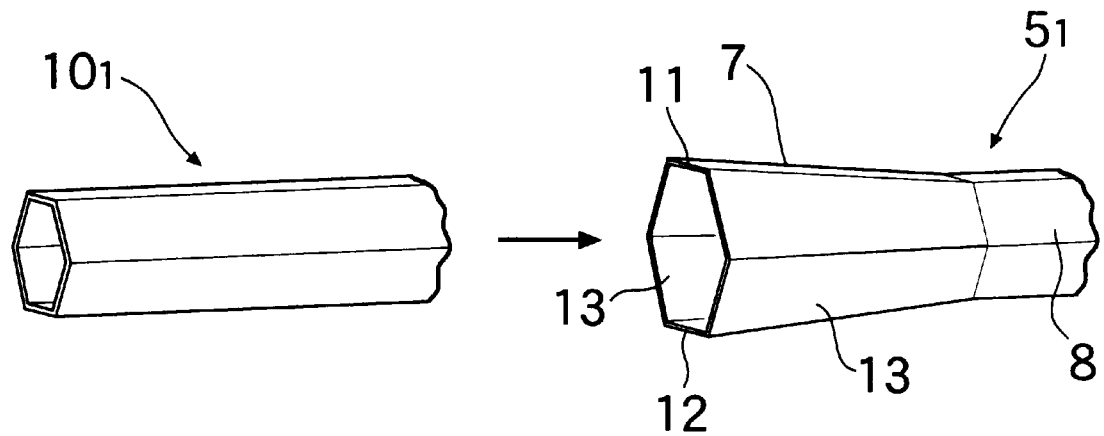
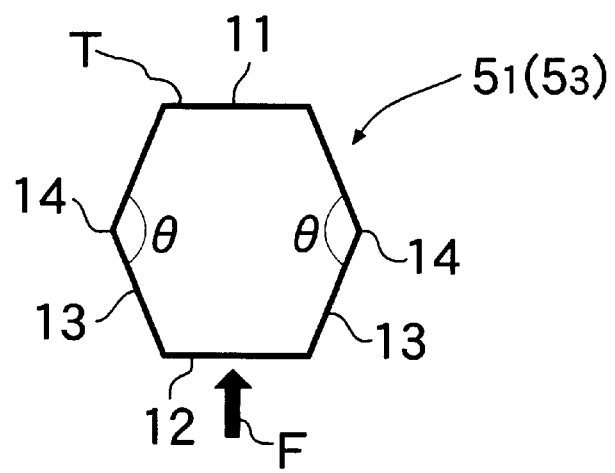
FIG.7A
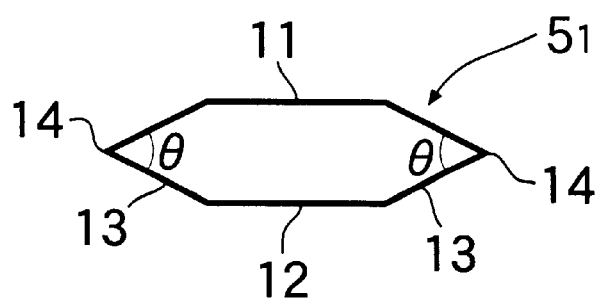
FIG.7B

HOLLOW FRAME MEMBER OF ALUMINUM ALLOY FOR VEHICLE BODY FRAME

BACKGROUND OF THE INVENTION

1. Field of the Invention

The present invention relates to a hollow frame member of an aluminum alloy for a vehicle body frame, and particularly, to such a hollow frame member of an aluminum alloy having a collision energy absorbing ability.

2. Description of the Related Art

Vehicle body frames that are formed by various hollow frame members made of an aluminum alloy and coupling members from the demand of a reduction in weight of an automobile are known. In this case, the vehicle body frame is provided, for example, with hollow frame members of an aluminum alloy, which are disposed at left and right side portions of a front portion of a vehicle body so as to extend longitudinally of the body and to exhibit a collision energy absorbing ability by crushing thereof.

To enhance the collision energy absorbing efficiency provided by these hollow frame members, it is required that the hollow frame member be crushed stably from its tip end upon collision of the vehicle, that a peak load on the hollow frame member be small, that a constant load be generated with a small amplitude of load after generation of the peak load, and that a surface receiving a collision load be wide enough to reliably receive the collision load.

However, the conventional hollow frame member is formed to have a large thickness over its entire length as well as a constant cross sectional area, because the aluminum alloy is low in durability from the viewpoint of its characteristic. For this reason, the conventional hollow frame member suffers from the following problems: the crushability thereof is unstable upon collision of the vehicle, and the peak load is relatively large. Moreover, the amplitude of the load after generation of the peak load is large, and a constant load cannot be generated. Further, the surface receiving the collision load is narrow. Therefore, in the vehicle body frame formed using the conventional hollow frame members, it is extremely difficult to sufficiently enhance the collision energy absorbing efficiency.

There is also a known vehicle body frame for an automobile, which constitutes a kick-up portion adjacent left and right front wheels and which is formed by bending an extruded pipe of an aluminum alloy having a circular cross section into a bow shape.

If a collision load is applied to a front end of the hollow frame member due to a frontal collision of a vehicle, a bending deformation is produced at a substantially lengthwise central portion of the hollow frame member so as to increase the bending degree of the frame member in order to absorb such collision load. In this case, a relatively large elongation is produced on an outer peripheral surface portion outside the bent portion, and the breaking of the outer peripheral surface portion occurs, because an aluminum alloy is small in elongation from the viewpoint of its characteristic. Such breaking must be avoided to the utmost, because it reduces the collision energy absorbing efficiency remarkably.

SUMMARY OF THE INVENTION

Accordingly, it is an object of the present invention to provide a hollow frame member of an aluminum alloy of the above-described type for a vehicle body frame, which is formed so that the collision energy absorbing efficiency can be sufficiently enhanced by providing a particular structure to the hollow frame member.

To achieve the above object, according to the present invention, there is provided a hollow frame member of an aluminum alloy for a vehicle body frame, which constitutes a portion of the vehicle body frame and has a collision energy absorbing ability, wherein the hollow frame member has an annular end surface at one end thereof as a collision load receiving surface, and has a cross sectional area which is gradually increased from the other end thereof toward the receiving surface, and a thickness which is gradually decreased from the other end toward the receiving surface.

Here, the cross sectional area refers to an area of the entire section surrounded by the profile of the hollow frame member existing in a plane perpendicular to the axis of the frame member, when the hollow frame member is cut in such plane.

If a relationship between the cross sectional area and the thickness is specified in the above manner, the hollow frame member is crushed stably from a tip end thereof upon collision of the vehicle, and a peak load on the hollow frame member is smaller. Further, a constant load is generated with a small amplitude of load after generation of the peak load. Moreover, the hollow frame member is formed in a divergent shape and has the wide receiving surface and hence, can reliably receive the collision load. With such hollow frame member, it is possible to sufficiently enhance the collision energy absorbing efficiency.

It is another object of the present invention to provide a hollow frame member of the above-described type, which is formed so that an elongation as described above can be inhibited by providing a particular structure to the hollow frame member.

To achieve the above object, according to the present invention, there is provided a hollow frame member of an aluminum alloy for a vehicle body frame, which is formed by bending an extruded pipe of an aluminum alloy into a bow shape to form a kick-up portion of the vehicle body frame, the extruded pipe comprising a band upper wall, a band lower wall opposed to the upper wall, and a pair of sidewalls which connect opposite side edges of the upper wall with opposite side edges of the lower wall, respectively, and which assume a V-shape in cross section.

In the above structure, if a collision load is applied to a front end of the hollow frame member adjacent a front portion of a vehicle body, for example, due to a frontal collision of the vehicle, a force pushing up the lower wall toward the upper wall due to a compressing force applied to the lower wall is generated at a substantially lengthwise central portion of the hollow frame member to absorb the collision load. As a result, bent portions of both the sidewalls are compressed and deformed so as to reduce the bent angle and hence, an elongation of the upper wall is inhibited in accordance with an amount of the compression and deformation.

Thus, it is possible to restrict the elongation of the upper wall within a limit value possessed by the aluminum alloy which is the material for forming the upper wall, thereby avoiding the breaking of the upper wall and to largely enhance the collision energy absorbing efficiency.

The above and other objects, features and advantages of the invention will become apparent from the following description of the preferred embodiment taken in conjunction with the accompanying drawings.

BRIEF DESCRIPTION OF THE DRAWINGS

FIG. 6 is a perspective view of an essential portion, showing a relationship between the tubular element made by the extrusion and a second example of the hollow side frame member;

FIG. 7A is an illustration showing a direction of application of a force to the second example of the hollow side frame member or the like;

FIG. 7B is an illustration showing the compression and deformation of the second example of the hollow side frame member;

DETAILED DESCRIPTION OF THE PREFERRED EMBODIMENTS

First Embodiment

Figure 1:
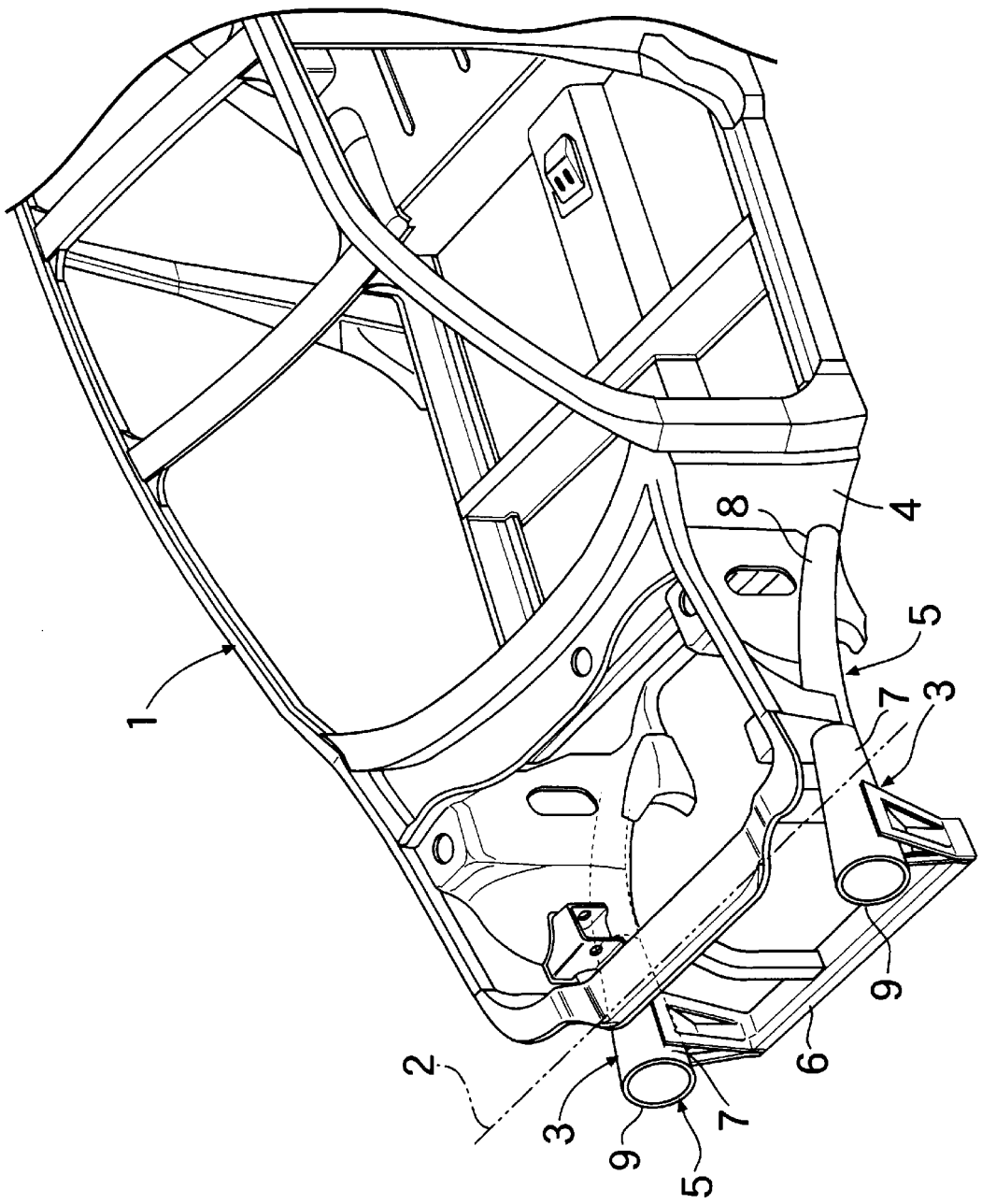
FIG. 1 is a perspective view of an essential portion of a vehicle body frame according to a first embodiment.

Referring to FIG. 1, a vehicle body frame 1 for an automobile is assembled using various frame members made of an aluminum alloy and a coupling member. A pair of kick-up portions 3 exist at a front portion of the vehicle body frame 1 to keep away from an axle 2 for left and right front wheels. Each of the kick-up portions 3 includes a hollow side frame member 5 as a bow-shaped hollow frame member fixed at its rear end to a floor member 4 and extending forwards, and a front cross member 6 which supports a front end of the hollow side frame member 5. In the illustrated embodiment, the single front cross member 6 is used commonly for the left and right kick-up portions 3.

Figure 2:
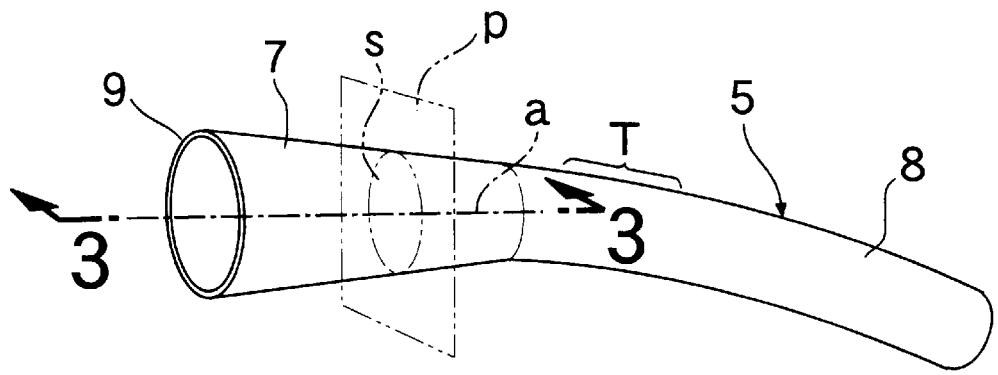
FIG. 2 is a perspective view of a first example of a hollow side frame member.
Figure 3:
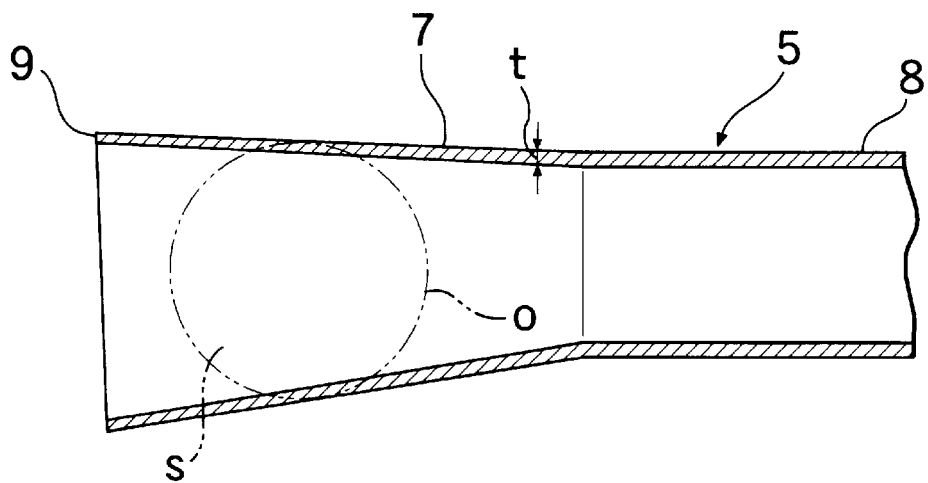
FIG. 3 is an enlarged sectional view taken along a line 3—3 in FIG. 2.

Each of the hollow side frame members 5 is formed from an aluminum alloy as best shown in FIGS. 2 and 3 and has a collision energy absorbing ability. More specifically, the hollow side frame member 5 is comprised of a front pipe portion 7 which is of a divergent shape, located at a lengthwise front portion of the vehicle body and which has a circular cross section, and a rear pipe portion 8 which is connected to a rear end of the front pipe portion 7, namely, a base end thereof and which has a circular cross section and a uniform diameter over the entire length thereof. The front pipe portion 7 includes an annular end surface serving as a collision load receiving surface 9 at one end, namely, a front end thereof. In the front pipe portion 7, the cross sectional area s is gradually increased from the other end, namely, the base end toward the receiving surface 9, and the thickness t is gradually decreased from the base end toward the receiving surface 9. The thickness of the rear pipe portion 8 is equal to the thickness of the base end of the front pipe portion 7 over the entire length thereof. The cross sectional area s in the front pipe portion 7 refers to an area of the entire portion surrounded by the profile o of the front pipe portion 7 existing in a plane p perpendicular to an axis a of the front pipe portion 7, when the front pipe portion 7 is cut in the plane p.

Figure 4:
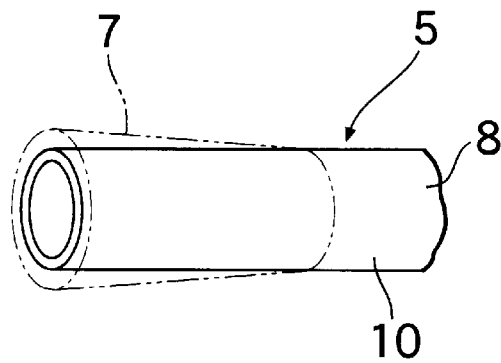
FIG. 4 is a perspective view of an essential portion, showing a relationship between a tubular element made by extrusion and the first example of the hollow side frame member.

In producing such a hollow side frame member 5, an extruded pipe 10 of an aluminum alloy having a circular cross section, which is similar to the rear pipe portion 8 as shown in FIG. 4, is produced. Then, the extruded pipe 10 is subjected to an expanding treatment over a predetermined length range to form a front pipe portion 7, and then bent into a bow shape.

Figure 5:
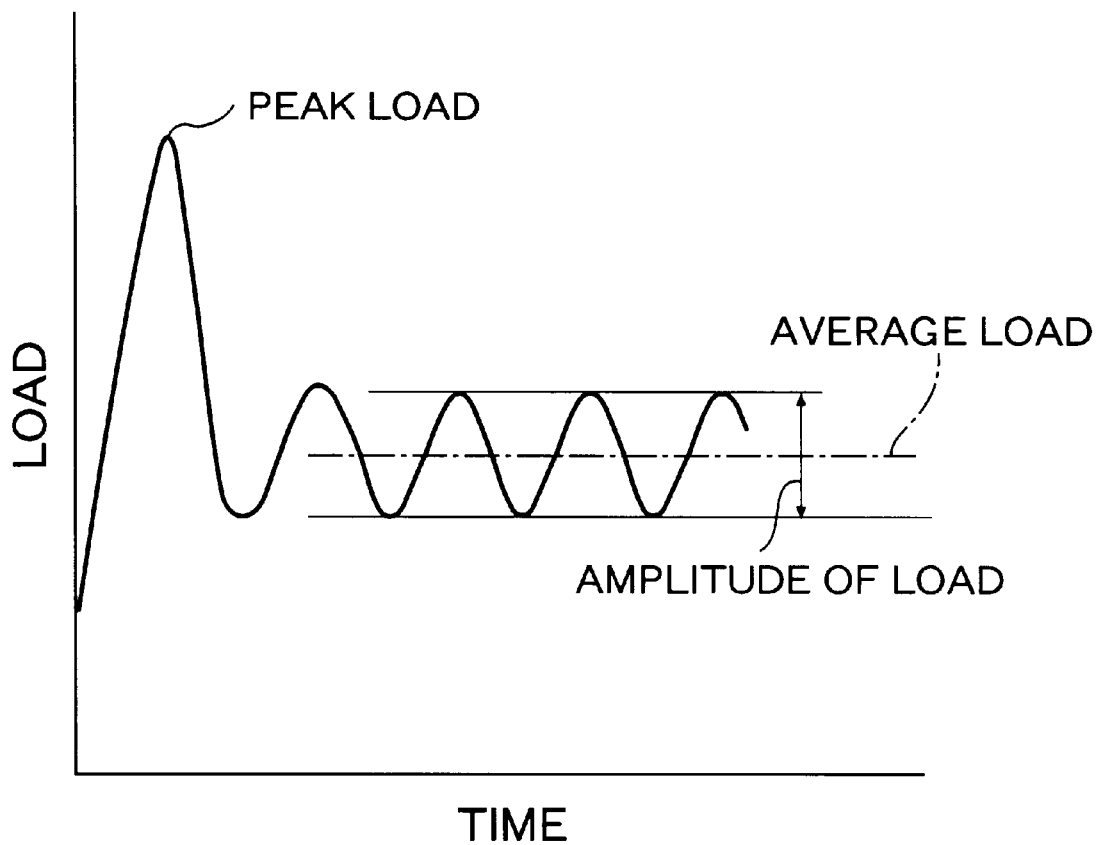
FIG. 5 is a graph showing a relationship between the time and the load.

If a relationship between the cross sectional area s and the thickness t in the front pipe portion 7 is specified as described above, the front pipe portion 7 is crushed stably from its tip end upon collision of the vehicle, and in a time-load curve shown in FIG. 5, the peak load on the front pipe portion 7 is decreased. Further, a constant load is generated with a smaller amplitude of load after generation of the peak load. Moreover, the front pipe portion 7 is formed into a divergent shape and the receiving surface 9 is wider and hence, can reliably receive the collision load. With the hollow side frame member 5 having such front pipe portion 7, it is possible to sufficiently enhance the collision energy absorbing efficiency.

Referring to FIG. 6, a hollow side frame member $5_1$ made of an aluminum alloy is comprised of the front pipe portion 7 which is of a divergent shape, located at lengthwise front portion of a vehicle body and has a hexagonal cross section, and the rear pipe portion 8 which has a hexagonal cross section, connected to a base end of the front pipe portion 7 and has a constant cross sectional area over the entire length thereof. In producing such hollow side frame member $5_1$, the same procedure as that described above is carried out using an extruded pipe $10_1$ similar to the rear pipe portion 8 and having a hexagonal cross section.

The hollow side frame member $5_1$, as best shown in FIG. 7A, includes a band-shaped upper wall 11, a band-shaped lower wall 12 opposed to the upper wall 11, and a pair of sidewalls 13 which connect opposite side edges of the upper wall 11 and opposite side edges of the lower wall 12, respectively and which assume a V-shape in cross section. Upon collision of the vehicle, the front pipe portion 7 is stably crushed from its tip end, in the same manner as that described above. If a force F pushing up the lower wall 12 toward the upper wall 11 due to a compressing force applied to the lower wall 12 as shown in FIG. 7A is generated at a substantially lengthwise central portion of the hollow side frame member $5_1$, namely, at a substantially top point T (as shown in FIG. 2 also) of a bow shape to absorb a collision load, then bent portions 14 of both sidewalls 13 are compressed and deformed, as shown in FIG. 7B, so that the bent angle θ thereof is decreased, and hence, an elongation of the upper wall 11 is inhibited in accordance with an amount of this compression and deformation. Thus, it is possible to restrict the elongation of the upper wall 11 within a limit value possessed by the aluminum alloy which is the material for forming the upper wall, thereby avoiding the breaking of the upper wall and to largely enhance the collision energy absorbing efficiency.

Figure 8:
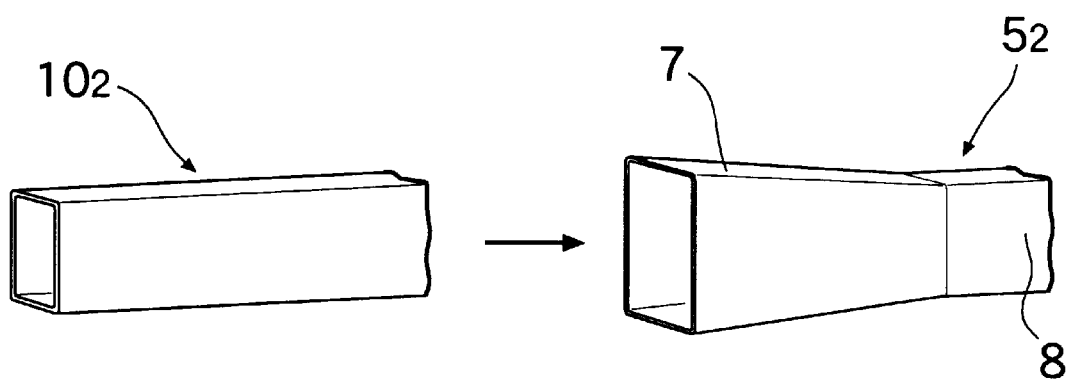
FIG. 8 is a perspective view of an essential portion, showing a relationship between the tubular element made by the extrusion and a third example of the hollow side frame member.

Referring to FIG. 8, a hollow side frame member $5_2$ made of an aluminum alloy is comprised of the front pipe portion 7 which is of a divergent shape, located at a lengthwise front portion of a vehicle body and has a rectangular cross section, and the rear pipe portion 8 which is connected to a base end of the front pipe portion 7, and which has a rectangular cross section and a constant cross-sectional area over the entire length thereof. In producing such hollow side frame member $5_2$, the same procedure as that described above is carried out using an extruded pipe $10_2$ similar to the rear pipe portion 8 and having a rectangular cross section.

Second Embodiment

Figure 9:
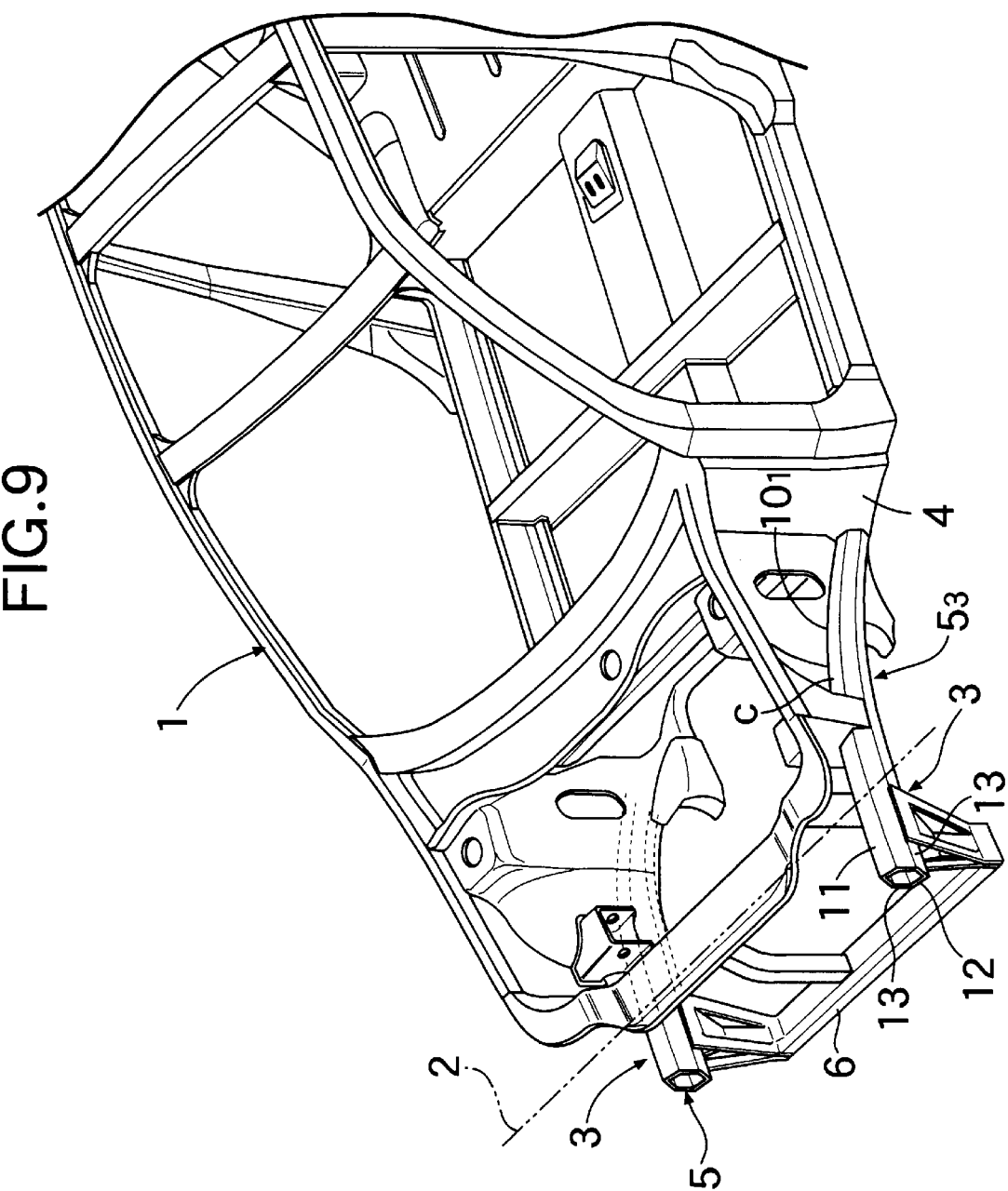
FIG. 9 is a perspective view of an essential portion of another example of a vehicle body frame.

Referring to FIG. 9, a vehicle body frame 1 for an automobile is assembled using various frame members made of an aluminum alloy and a coupling member. A pair of kick-up portions 3 exist at a front portion of the vehicle body frame 1 to keep away from an axle 2 for left and right front wheels. Each of the kick-up portion 3 includes a hollow side frame member $5_3$ fixed at its rear end to a floor member 4 and extending forwards, and a front cross member 6 which supports a front end of the hollow side frame member $5_3$. In the illustrated embodiment, the single front cross member 6 is used commonly for the left and right kick-up portions 3.

Figure 10:
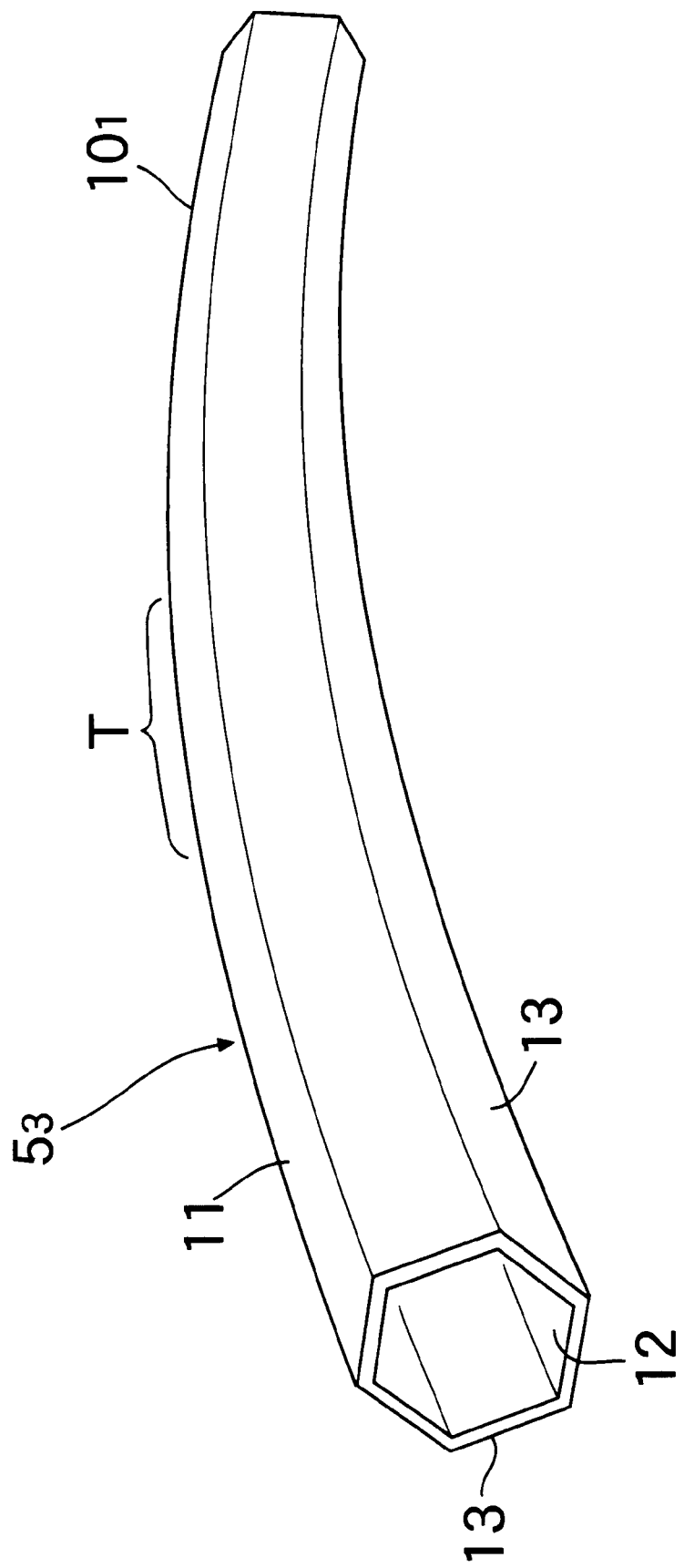
FIG. 10 is a perspective view of a fourth example of the hollow side frame member.

Each of the hollow side frame members $5_3$ is formed by bending an extruded pipe $10_1$ of an aluminum alloy having a hexagonal cross section into a bow shape, as best shown in FIG. 10. Therefore, the hollow side frame member $5_3$ is comprised of a band-shaped upper wall 11, a band-shaped lower wall 12 opposed to the upper wall 11, and a pair of sidewalls 13 which connect opposite side edges of the upper wall 11 and opposite side edges of the lower wall 12, respectively and which assume a V-shape in cross section.

In the above structure, if a collision load is applied to the front end of the hollow side frame member $5_3$ due to a frontal collision of the vehicle, a force F pushing up the lower wall 12 toward the upper wall 11 due to a compressing force applied to the lower wall 12 is generated at a substantially lengthwise central portion of the hollow side frame member $5_3$, namely, a substantially top point T (as shown in FIG. 10 also) of the bow shape, to absorb the collision load as shown in FIG. 7A. As a result, bent portions 14 of both the sidewalls 13 are compressed and deformed, as shown in FIG. 7B, so that the bent angle θ thereof is decreased, and hence, an elongation of the upper wall 11 is inhibited in accordance with an amount of this compression and deformation. Thus, it is possible to restrict the elongation of the upper wall 11 within a limit value possessed by the aluminum alloy which is a material for forming the upper wall 11, thereby avoiding the breaking of the upper wall 11 and to largely enhance the collision energy absorbing efficiency.

Figure 11:
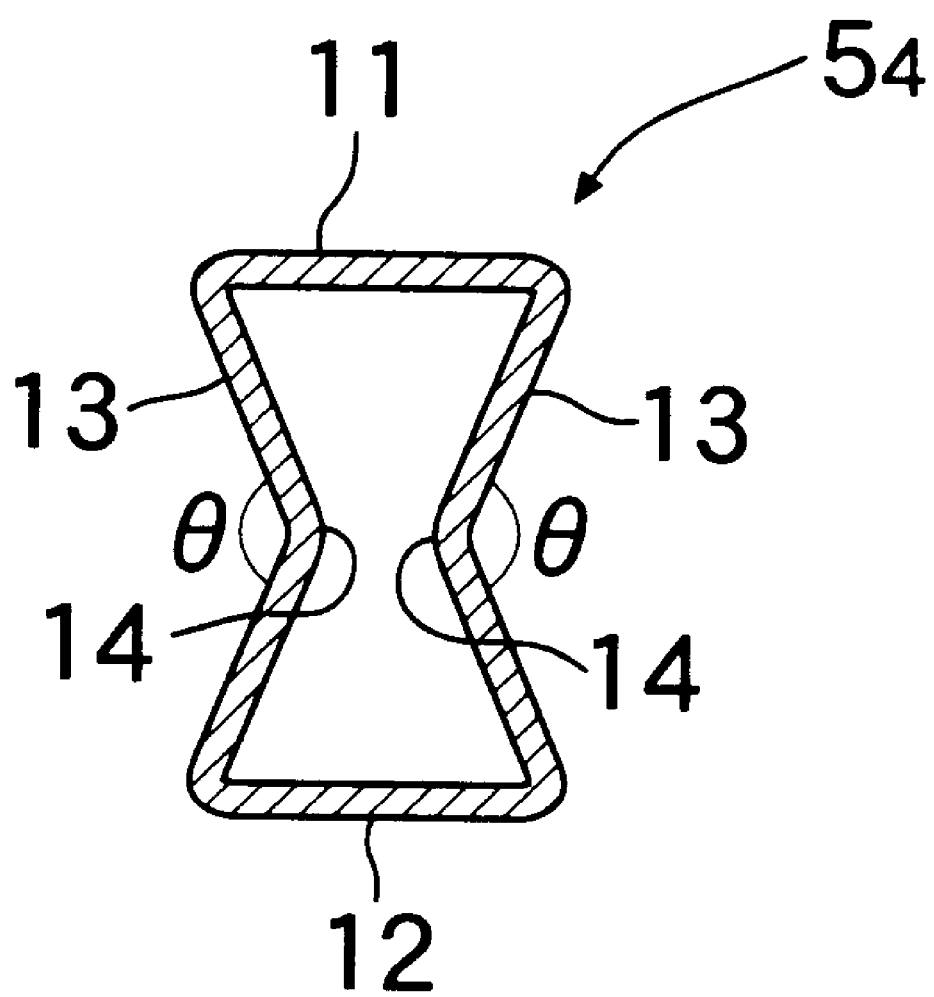
FIG. 11 is a cross-sectional view of a fifth example of the hollow side frame member.

As shown in FIG. 11, an extruded pipe and thus a hollow side frame member $5_4$ may be formed to assume a hand drum shape, or an hourglass shape, in cross section. In this case, the hollow side frame member $5_4$ is designed so that the collision of the bent portions 14 is not produced, while the bent portions 14 of both the sidewalls 13 are being compressed and deformed so that the bent angle θ is decreased.

Each of the hollow side frame members 5, $5_1$ to $5_4$ can be also applied to a kick-up portion for the rear wheels.

What is claimed is:

1. A hollow frame member for a vehicle body frame, which constitutes a portion of the vehicle body frame and has a collision energy absorbing ability, wherein the hollow frame member has an annular end surface at one end thereof as a collision load receiving surface, and has a cross sectional area which is gradually increased from the other end toward said receiving surface, and a thickness which is gradually decreased from said other end toward said receiving surface.

2. A hollow frame member for a vehicle body frame, according to claim 1, wherein said hollow frame member is bent into a bow shape to constitute a kick-up portion of said vehicle body frame, and has a hexagonal cross section, said hollow frame member including a band-shaped upper wall, a band-shaped lower wall opposed to said upper wall, and a pair of sidewalls which connect opposite side edges of said upper wall with opposite side edges of said lower wall, respectively, and which assume a V-shape in cross section.

3. A hollow frame member for a vehicle body frame according to claim 1, wherein said frame member is formed from an aluminum alloy.

4. A hollow frame member for a vehicle body frame according to claim 1, wherein said hollow frame member has a circular cross section.

5. A hollow frame member for a vehicle body frame according to claim 1, wherein said hollow frame member has a rectangular cross section.

6. A hollow frame member for a vehicle body frame, which comprises a one-piece extruded pipe having a continuously vertically curved bow-shape connected at a first end to a floor member of the vehicle body frame and at a second end to a collision load receiving surface forming a kick-up portion of the vehicle body frame, said one-piece extruded pipe comprising a band-shaped upper wall, a band-shaped lower wall opposed to said upper wall, and a pair of sidewalls which connect opposite side edges of said upper wall with opposite side edges of said lower wall, respectively, and which assume a V-shape in cross section.

7. A hollow frame member for a vehicle body frame according to claim 6, wherein said one-piece extruded pipe assumes a hexagonal cross section.

8. A hollow frame member for a vehicle body frame according to claim 6, wherein said one-piece extruded pipe assumes a hand drum shape, or an hourglass shape, in cross section.

9. A hollow frame member for a vehicle body frame according to claim 6, wherein said frame member is formed from an aluminum alloy.

10. A hollow frame member for a vehicle body frame according to claim 6, wherein said hollow frame is formed to absorb a load applied thereto by deformation thereof.

\* \* \* \* \*